United States Patent
Spinks

(10) Patent No.: US 6,602,444 B1
(45) Date of Patent: Aug. 5, 2003

(54) LOW MELT FLOW COMPOSITION

(75) Inventor: Anne E. Spinks, Hugo, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/410,292

(22) Filed: Sep. 30, 1999

(51) Int. Cl.⁷ .............................. C09K 3/00; E06B 3/24; E04C 2/54
(52) U.S. Cl. ...................... 252/194; 428/34; 52/786.13; 52/172
(58) Field of Search .......................... 252/194; 428/34, 428/461, 516; 52/786.1, 172, 786.13

(56) References Cited

U.S. PATENT DOCUMENTS

| | | |
|---|---|---|
| 3,965,215 A | 6/1976 | Lopez et al. |
| 4,045,401 A | 8/1977 | Stenmark et al. |
| 4,109,431 A | 8/1978 | Mazzoni et al. |
| 4,197,381 A | 4/1980 | Alia |
| 4,198,254 A | 4/1980 | Laroche et al. |
| 4,226,063 A | 10/1980 | Chenel |
| 4,431,691 A * | 2/1984 | Greenlee ................. 428/34 |
| 4,622,249 A | 11/1986 | Bowser |
| 4,994,309 A | 2/1991 | Reichert et al. |
| 5,436,040 A * | 7/1995 | Lafond ................... 428/34 |
| 5,503,884 A | 4/1996 | Meyer et al. |
| 5,509,984 A | 4/1996 | Meyer et al. |
| 5,510,416 A | 4/1996 | Meyer et al. |
| 6,212,756 B1 * | 4/2001 | Ferri ....................... 428/34 |

FOREIGN PATENT DOCUMENTS

| | | |
|---|---|---|
| EP | 0475 213 A1 | 3/1992 |
| WO | WO 96/37289 | 11/1996 |

OTHER PUBLICATIONS

Edgetech I.G. Ltd., Technical Report "Super Spacer" by Michael Glover & Gerhard Reichart, Sep. 1989, 32 pages.

* cited by examiner

*Primary Examiner*—Donald J. Loney

(57) ABSTRACT

A composition that includes a polyalphaolefin polymer and from about 20% by weight to about 70% by weight adsorbent, the composition being essentially free of a film forming agent.

19 Claims, 1 Drawing Sheet

LOW MELT FLOW COMPOSITION

BACKGROUND OF THE INVENTION

The invention relates to low melt flow compositions.

Insulating glass units often include two panels of glass separated by a spacer. The panels of glass are placed parallel to each other and the spacer is sealed to the glass. Insulating glass units also have other structures including two spacers and three glass panels. There are also a variety of spacers available including hollow metal tubes, nonmetal tubes, preformed roll type spacers, plastic spacers, metal U-channels, and various organic and inorganic foams.

Insulating glass units are prone to the accumulation of chemical "fog" on the interior surface of the glass panels. Fogging can be caused by off gassing of organic and inorganic materials in the spacer or from other structures in the interior of the insulating glass assembly, e.g., painted decorative grids. The spacers frequently contain a desiccant to adsorb residual moisture that may enter the airspace during the life of the unit. Desiccants are available in a variety of forms including compositions that include organic or inorganic carriers and an adsorbent capable of adsorbing moisture or volatile organic compounds. When placed in an insulating glass assembly these compositions reduce fogging.

SUMMARY

In one aspect, the invention features a composition that includes a polyalphaolefin polymer, and from about 20% by weight to about 70% by weight adsorbent, the composition being essentially free of a film forming agent. In one embodiment, the polyalphaolefin polymer includes monomers selected from the group consisting of ethylene, propylene, butene, pentene, hexene, octene, decene, terpene, isoprene, styrene, butadiene, vinyl acetate and combinations thereof.

In other embodiments, the composition includes from about 40% by weight to about 70% by weight adsorbent. In one embodiment, the adsorbent includes an organic adsorbent. In some embodiments, the composition further includes no greater than about 10% by weight organic adsorbent.

In another embodiment, the composition, when applied to a substrate and subjected to 88° C. for one month, is free of visible sag.

In some embodiments, the composition exhibits a melt flow time of no greater than 60 seconds, preferably no greater than 15 seconds, more preferably less than 5 seconds.

In another aspect, the invention features an insulating glass assembly that includes a first glass substrate, a second glass substrate, a separator disposed between the first glass substrate and the second glass substrate, and an above-described composition in contact with the separator.

In other aspects, the invention features a composition that includes a polyalphaolefin polymer and from about 20% by weight to about 70% by weight adsorbent, the composition exhibiting a melt flow time of less than 5 seconds at 190° C.

In some aspects, the invention features a composition that consists essentially of a polyalphaolefin polymer, from about 20% by weight to about 70% by weight of an adsorbent selected from the group consisting of moisture adsorbents, volatile organic adsorbents, and combinations thereof, from 0 to 10% by weight tackifying resin, and from 0 to 5% by weight antioxidant. In one embodiment, the composition consists essentially of polyalphaolefin polymer and adsorbent.

A film forming agent is a material other than a polyalphaolefin polymer that forms a film or assists in forming a film including, e.g., polyisobutylene and butyl rubber.

The adsorbent composition adheres to separators (e.g., metal or plastic channels) used in insulating glass units without sagging or loss of adhesion during the useful life of the unit in which the composition is incorporated. The adsorbent composition can adsorb moisture and volatile organic compounds from its surrounding atmosphere.

The adsorbent composition is also pumpable (i.e., has a melt flow time of no greater than about 60 seconds when tested per ASTM D-1238, Procedure B using an 1100 gram load and a 6–8 gram sample, at 190° C. (374° F.)) and exhibits a sufficiently low melt flow time such that the composition flows easily. The adsorbent composition is particularly well suited for use in insulating glass assemblies and in processes for preparing insulating glass assemblies. Insulating glass assemblies that include the adsorbent composition can be free from fogging during the useful life of the glass assembly.

The adsorbent compositions include large amounts of adsorbent, yet exhibit melt flow times of less than 5 seconds at 190° C.

Additional features and advantages of the invention will be apparent from the description of the preferred embodiment thereof and from the claims.

DETAILED DESCRIPTION

Figure 1:
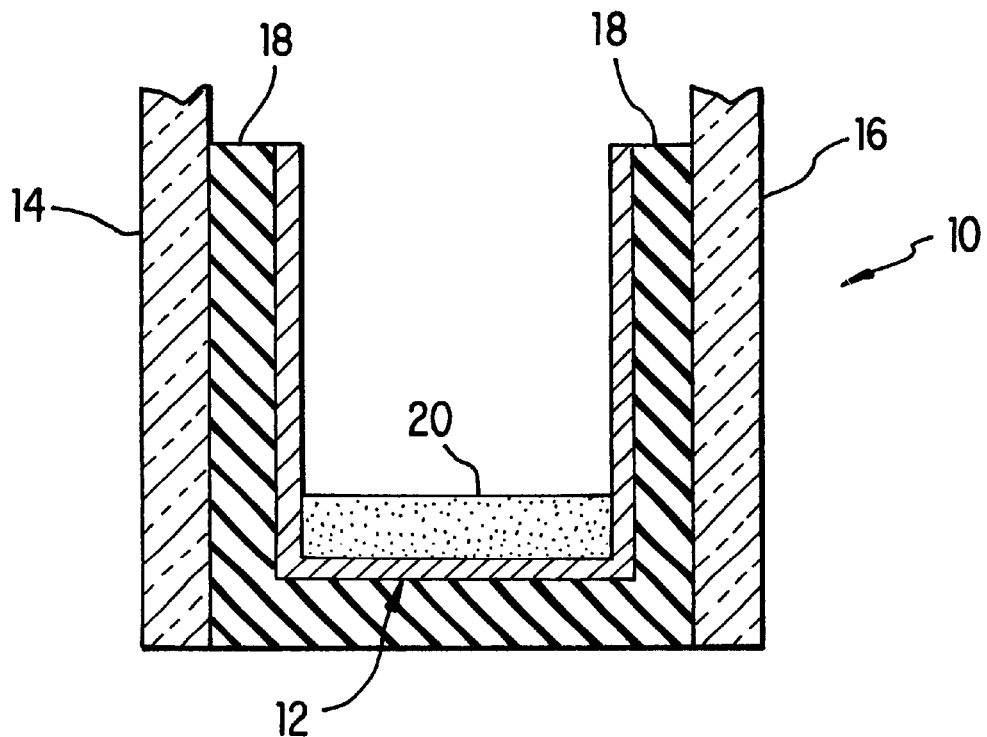
FIG. 1 is a sectional view of an edge assembly of an insulating glass unit that includes an adsorbent composition.
Figure 2:
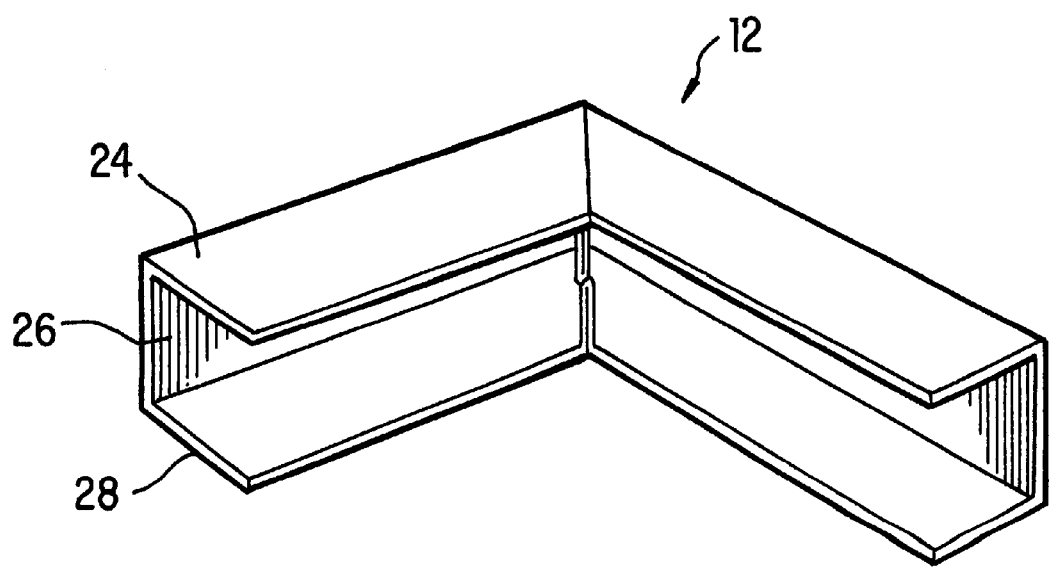
FIG. 2 is a sectional view of a corner of a separator of the insulating glass unit of FIG. 1.

Referring to FIGS. 1 and 2, an insulating glass unit 10 includes separator 12 positioned between glass sheets 14, 16. Separator 12 is adhered to glass sheets 14, 16 with a moisture and/or gas impervious adhesive 18. An adsorbent composition 20 is disposed in channel 22 defined by walls 24, 26, and 28 of separator 12. The adsorbent composition preferably adheres to the channel 22 defined by separator 12. Separator 12 can be made of a variety of materials including, e.g., polymers and metal. Useful metal substrates include, e.g., aluminum, steel, stainless steel, nickel, and tin. Insulating glass assemblies can be constructed in a variety of forms. Examples of suitable glass assemblies are described in, e.g., EP 475,213 and incorporated herein.

The adsorbent composition is formulated to adsorb chemicals present in the atmosphere to which the adsorbent composition will be exposed. The adsorbent composition is formulated to be useful as a desiccating composition. Preferably the adsorbent composition is formulated to adsorb moisture, organic vapors, and combinations thereof. The adsorbent composition is formulated such that insulating glass assemblies that include the adsorbent composition are free from fog during the useful life of the assembly. Preferably the adsorbent composition and insulating glass assemblies that include the adsorbent composition pass the ASTM E1887 fog test for insulating glass units.

The adsorbent composition exhibits a melt flow time of no greater than about 60 seconds, more preferably no greater than about 15 seconds, most preferably less than 5 seconds, when tested according to ASTM D-1238, Procedure B, using a 1100 gram load and an 8 gram sample at 190° C. (374° F.).

The adsorbent composition is also preferably free from sag (i.e., visible movement) when applied to the substrate. Preferably the adsorbent composition is free from sag after being adhered to a substrate and maintained at a temperature of at least 60° C. (140° F.) for a period of at least two weeks, preferably for a period of at least about one month at a temperature of 88° C. (190° F.).

The adsorbent composition includes a polyalphaolefin polymer and an adsorbent. The polyalphaolefin polymer is selected to exhibit sufficient cohesive strength and heat resistance such that the polymer can be placed in an open U-channel insulating glass assembly without impairing the utility of the glass assembly. The volatile organic content of the polyalphaolefin polymer is preferably no greater than about 20% by weight, more preferably no greater than about 5% by weight. The polyalphaolefin polymer is preferably amorphous, i.e., low degree of crystallinity.

Useful polyalphaolefin polymers have a number average molecular weight (Mn) of from about 7,000 to about 14,000, a weight average molecular weight (Mw) of from about 35,000 to about 90,000; and a polydispersity (MWD) no greater than 6.2.

Suitable polyalphaolefin polymers include, e.g., homopolymers, copolymers, terpolymers, random polymers, block polymers, radial polymers, star branched polymers, multicomponent polymers, and combinations thereof. Useful polymers include monomers including, e.g., ethylene, propylene, butene, hexene, octene, decene, terpenes, isoprenes, vinyl acetate, styrene and butadiene. Examples of useful polymers include propylene-ethylene, propylene-butene, propylene-ethylene-butene, styrene-isoprene-styrene, styrene-butadiene-styrene, styrene-ethylene-butene-styrene, and styrene-ethylene-propylene-styrene, ethylvinyl acetate, oxides of ethylvinyl acetate, and combinations thereof.

Useful commercially available propylene polymers include, e.g., Eastman E1003 amorphous propylene-ethylene copolymer (Eastman Chemical), the Rextac series of amorphous polyolefin polymers including Rextac 2100 series homopolymers, Rextac 2500 series ethylene-propylene copolymers, and Rextac 2700 series butene-propylene copolymers and terpolymers. Other useful polymers include polymers available under the trade designations Eastoflex (available from Eastman Chemical) including Eastoflex T1035 polypropylene-ethylene-butene terpolymer having a Mn of about 4,000 and a Mw of about 16,000, K-Tac A-100 amorphous polypropylene (available from Baychem), Insight™ polyalphaolefin polymers commercially available from Dow Chemical (Midland, Mich.) and Exxact™ polyalphaolefin polymers commercially available from Exxon Chemical (Texas).

The composition is preferably essentially free of film forming agents, more preferably free of film forming agents including e.g., polyisobutylene and butyl rubber.

The adsorbent of the composition is capable of adsorbing molecules present in the atmosphere to which the adsorbent is exposed. The adsorbent is selected based upon the characteristics of the application in which the adsorbent composition is to be used and the desired molecules to be adsorbed. The adsorbent can be selected to adsorb chemicals including, e.g., moisture, organic species (e.g., hydrocarbons, aromatics, and carbon dioxide), and combinations thereof. Preferably the adsorbent is an inorganic particulate material. Examples of useful adsorbents include natural zeolite (e.g., chabasite, gumerinite, levynite, erinite, mordenite and analcite), molecular sieves (e.g., alkali metal alumino-silicates), silica gel, silica-magnesia gel, silica-alumina gel, activated carbon, activated alumina, calcium oxide and combinations thereof. Suitable alkali metal alumino-silicate molecular sieves include, e.g., calcium, potassium, and sodium alkali metal alumino silicates. Useful molecular sieves are available under the trade designations Molsiv® Adsorbent Type 13x, and Molecular Sieve Type 3A, Type 4A and Type 5A, which are all commercially available from UOP (Illinois) and molecular sieves available from W.R. Grace (Maryland). Preferably the adsorbent exhibits a particle size of no greater than about 50 to about 100 mesh.

Useful adsorbent compositions include an adsorbent capable of adsorbing moisture in an amount of at least about 20% by weight, preferably from about 20% by weight to about 70% by weight, more preferably from about 30% by weight to about 70% by weight, most preferably from about 40% by weight to about 70% by weight. Preferably the adsorbent composition also includes an adsorbent capable of adsorbing organic species in an amount of no greater than about 20% by weight of, more preferably from about 8% by weight to about 10% by weight. A particularly useful adsorbent mixture includes from about 20% by weight to about 60% by weight adsorbent capable of adsorbing moisture and 8–10% by weight adsorbent capable of adsorbing organic species.

The adsorbent composition can optionally include a tackifying resin. Suitable tackifying resins are compatible with the polyalphaolefin polymer, exhibit good UV resistance, and contain no greater than low amounts (preferably are free) of components capable of volatilizing at temperatures encountered by insulating glass units. Examples of suitable tackifying resins include hydrogenated wood rosin, e.g., Foral 105 (commercially available from Hercules, Delaware), hydrocarbon tackifying resins, e.g., RegalRez 1094 hydrogenated hydrocarbon tackifying resin (Hercules, Delaware) and ECR 165C $C_5/C_9$ tackifying resin (available from Exxon Chemical, Tennessee). Preferably the composition includes no greater than 60% by weight tackifying resin, more preferably no greater than about 20% by weight, most preferably the composition is free from tackifying resin.

The adsorbent composition can also include additives, e.g., fillers, pigments, antioxidants, UV and thermal stabilizers, adhesion promoters and combinations thereof. Examples of useful fillers include calcium carbonate, e.g., Hubercarb Q-325 calcium carbonate available from J.M. Huber (Illinois), talc, e.g., Nytal Talc available from R. T. Vanderbilt Co. (Connecticut), Snobrite clay available from Albion Kaolin Co. (Georgia), mica, e.g., Minerolite Mica available from Mineral Mining Corp. (South Carolina), and fumed silica available from Cabot Corp. (Illinois). Treated and coated fillers are also useful.

The invention will now be further described by way of the following examples.

EXAMPLES

Test Procedures

Test procedures used in the examples include the following.

Melt Flow Time Test Procedure

Melt flow time is measured according to ASTM Test Method D-1238 Procedure B using a 1100 gram weight and a 6–8 gram sample at a temperature of 190° C. The amount of time it takes for the sample to flow out of the orifice of a Kayness D7031 Melt Flow Apparatus (Kayness Inc., Pennsylvania) is recorded as the melt flow time.

Sag Test Procedure

A 0.5"×3"×0.06" film is aligned on a 1"×4" tin plated steel substrate, heated in an oven to adhere the film to the substrate, and then cooled. The sample is then hung vertically in an oven at 190° F. (88° C.). The sample is observed for visible signs of film movement.

Fog Test Procedure

The sample is tested for fog according to ASTME E1887 for insulating glass units. The sample is recorded as a pass or a fail.

Sample Preparation

Example 1

600 g Eastoflex E1003 amorphous propylene-ethylene copolymer (Eastman Chemical, Tennessee) and 150 g Type 3A molecular sieve (UOP, Illinois) were combined and mixed for one hour at approximately 150° C.

The melt flow time of the composition of Example 1 was measured. The composition ran through the orifice of the test apparatus prior to applying a weight to the sample. Accordingly, the composition was determined to have a melt flow time of less than 5 seconds at 190° C.

Example 2

480 g Eastoflex E1003 amorphous propylene/ethylene copolymer, 120 g Type 3A molecular sieve (UOP) and 360 g Type 3A molecular sieve (UOP) were combined and mixed for one hour at approximately 150° C.

The melt flow time of the composition of Example 2 was measured. The composition ran through the orifice of the test apparatus prior to applying a weight to the sample. Accordingly, the composition was determined to have a melt flow of less than 5 seconds at 190° C.

Example 3

150 g Eastoflex E1003 amorphous propylene-ethylene copolymer and 150 g Type 3A molecular sieve (UOP) were combined and mixed for one hour at approximately 150° C.

The melt flow time of the composition of Example 3 was measured. The composition ran through the orifice of the test apparatus prior to applying a weight to the sample. Accordingly, the composition was determined to have a melt flow time of less than 5 seconds at 190° C.

Example 4

120 g Eastoflex E1003 amorphous propylene-ethylene copolymer and 180 g Type 3A molecular sieve (UOP) were combined and mixed for one hour at 150° C.

The melt flow time of the composition of Example 4 was measured. The composition ran through the orifice of the test apparatus prior to applying a weight to the sample. Accordingly, the composition was determined to have a melt flow time of less than 5 seconds at 190° C.

Example 5

90 g Eastoflex E1003 amorphous propylene-ethylene copolymer and 210 g Type 3A molecular sieve (UOP) were combined and mixed for one hour at 180° C.

The melt flow time of the composition of Example 5 was measured according to the Melt Flow Time Test Procedure and was determined to have a melt flow time of 37 seconds at 190° C.

Example 6

66.4 g Hubercarb Q325 calcium carbonate (J. M. Huber), 513.4 g Eastman D178 amorphous propylene/ethylene copolymer (Eastman Chemical), 0.2 Monarch 120 carbon black (Cabot Corp, Massachusetts), 6.1 g Irganox 1076 antioxidant, 21.8 Kronos 2020 titanium dioxide (Kronos Inc., Texas), 53.7 Indopol H100 polybutene (Amoco Corp, Illinois), 138.4 g Type 3A molecular sieve (UOP), 293.6 g Type 3A molecular sieve (W.R. Grace), and 108 g Type 13x molecular sieve (W.R. Grace) were combined and mixed together for one hour at 150° C.

The composition was tested according to the Melt Flow Time Test Procedure. The composition ran through the orifice of the test apparatus prior to applying a weight to the sample. Accordingly, the composition was determined to have a melt flow time of less than 5 seconds at 190° C.

Example 7

512.8 g Eastman D-178 polymer, 65.9 g Hubercarb Q325 calcium carbonate, 0.20 carbon black, 21.6 g Kronos 2020 titanium dioxide, 6.0 Irganox 1076 antioxidant, 53.9 Indopol H1500 polybutene, 432.4 Type 3A molecular sieve (W.R. Grace and UOP), and 108.0 g Type 13x molecular sieve (W.R. Grace) were combined and mixed together for one hour at 150° C.

The composition was tested according to the Melt Flow Time Test Procedure. The composition ran through the orifice of the test apparatus prior to applying a weight to the sample. Accordingly, the composition was determined to have a melt flow time of less than 5 seconds at 190° C.

Example 8

512.8 g Eastman D-178 polyalphaolefin polymer, 77.9 g Hubercarb Q325 calcium carbonate, 0.10 Monarch 120 carbon black, 21.6 g Kronos 2020 titanium dioxide, 52.0 Indopol H1500 polybutene, 432.1 Type 3A molecular sieve (UOP), and 108.0 g Type 13x molecular sieve (UOP) were combined and mixed together for one hour at 150° C.

The composition was tested according to the Melt Flow Time Test Procedure. The composition ran through the orifice of the test apparatus prior to applying a weight to the sample. Accordingly, the composition was determined to have a melt flow time of less than 5 seconds at 190° C.

Example 9

452.9 g Eastman D-178 polyalphaolefin polymer, 72.0 g Hubercarb Q325 calcium carbonate, 0.2 Monarch 120 carbon black, 21.6 g Kronos 2020 titanium dioxide, 53.5 g Indopol H1500 polybutene, 493.0 g Type 3A molecular sieve, and 109.8 g Type 13x molecular sieve (W.R. Grace) were combined and mixed together for one hour at 150° C.

The composition was tested according to the Melt Flow Time Test Procedure. The composition ran through the orifice of the test apparatus prior to applying a weight to the sample. Accordingly, the composition was determined to have a melt flow time of less than 5 seconds at 190° C.

Example 10

514.1 g Eastman D-178 polyalphaolefin polymer, 72.0 g Hubercarb Q325 calcium carbonate, 0.2 Monarch 120 carbon black, 22.1 g Kronos 2020 titanium dioxide, 53.2 Indopol H1500 polybutene, 432.5 Type 3A molecular sieve (UOP), and 108.1 g Type 13x molecular sieve (W.R. Grace) were combined and mixed together for one hour at 150° C.

The composition was tested according to the Melt Flow Time Test Procedure. After the 1100 gram weight was applied to the piston, the composition immediately ran through the orifice of the test apparatus. Accordingly, the composition was determined to have a melt flow time of less than 5 seconds at 190° C.

The melt flow time and sag of the compositions of Examples 1–10 were determined. The results are reported in Table 1.

TABLE 1

| Example | Polymer (% by wt) | Adsorbent (% by wt) | Antioxidant (% by wt) | Filler and Pigment (% by wt) | Melt Flow Time (Seconds) | Sag | Sag |
|---|---|---|---|---|---|---|---|
| 1 | 80 | 20 | 0 | 0 | <5 | NT | NT |
| 2 | 50 | 50 | 0 | 0 | <5 | NT | NT |
| 3 | 50 | 50 | 0 | 0 | <5 | No visible movement or sag after 24 hours. | No visible movement or sag after 43 hours. |
| 4 | 40 | 60 | 0 | 0 | <5 | NT | NT |
| 5 | 30 | 70 | 0 | 0 | <5 | NT | NT |
| 6 | 47.2 | 45 | 0.5 | 7.3 | <5 | NT | NT |
| 7 | 47.2 | 45 | 0.5 | 7.3 | <5 | NT | NT |
| 8 | 47.2 | 45 | 0 | 7.8 | <5 | NT | NT |
| 9 | 42.2 | 50 | 0 | 7.8 | <5 | NT | NT |
| 10 | 47.2 | 45 | 0 | 7.8 | <5 | NT | NT |

NT = not tested

Other embodiments are within the claims.

What is claimed is:

1. A composition comprising:

a polyalphaolefin polymer; and from about 20% by weight to about 70% by weight adsorbent, said composition being essentially free of a film forming agent, said composition exhibiting a melt flow time of no greater than 60 seconds at 190° C.

2. The composition of claim 1, wherein said polyalphaolefin polymer comprises a polymer comprising monomers selected from the group consisting of ethylene, propylene, butene, pentene, hexene, octene, decene, isoprene, terpene, vinyl acetate, styrene, butadiene, and combinations thereof.

3. The composition of claim 1, wherein said composition exhibits a melt flow time of no greater than 15 seconds at 190° C.

4. The composition of claim 1, wherein said composition exhibits a melt flow time of less than 5 seconds at 190° C.

5. The composition of claim 1, wherein said composition comprises from about 40% by weight to about 70% by weight adsorbent.

6. The composition of claim 1, wherein said adsorbent comprises an adsorbent capable of adsorbing organic species.

7. The composition of claim 1, wherein said composition, when applied to a substrate and subjected to 88° C. for one month, is essentially free from sag.

8. The composition of claim 1, wherein said composition passes the ASTM E1887 fog test.

9. An insulating glass assembly comprising:

a first glass substrate;

a second glass substrate;

a separator disposed between said first glass substrate and said second glass substrate; and the composition of claim 1 in contact with said separator.

10. The assembly of claim 9, wherein said composition exhibits a melt flow time of less than 5 seconds at 190° C.

11. A composition comprising:

a polyalphaolefin polymer; and from about 20% by weight to about 70% by weight adsorbent, said composition exhibiting a melt flow time of less than 5 seconds at 190° C.

12. The composition of claim 11, wherein said composition is essentially free from sag after being subjected to 88° C. for one month.

13. The composition of claim 11, comprising from about 40% by weight to about 70% by weight of said adsorbent.

14. A composition consisting essentially of:

a polyalphaolefin polymer;

from about 20 to about 70% by weight of an adsorbent selected from the group consisting of moisture adsorbents, volatile organic adsorbents, and combinations thereof;

from 0 to 10% by weight tackifying resin; and from 0 to 5% by weight antioxidant, said composition exhibiting a melt flow time of no greater than 60 seconds at 190° C.

15. The composition of claim 14 consisting essentially of said polyalphaolefin polymer and said adsorbent.

16. An insulating glass assembly comprising:

a first glass substrate;

a second glass substrate;

a separator disposed between said first glass substrate and said second glass substrate; and the composition of claim 11, in contact with said separator.

17. The insulating glass assembly of claim 16, wherein said assembly passes the ASTM E1887 fog test.

18. An article comprising:

a metal substrate; and the composition of claim 11 disposed on said metal substrate.

19. The article of claim 18, wherein said composition is essentially free from sag after being subjected to 88° C. for one month.

* * * * *